US006811757B2

(12) United States Patent
Niv et al.

(10) Patent No.: US 6,811,757 B2
(45) Date of Patent: Nov. 2, 2004

(54) DIELECTRIC BARRIER DISCHARGE FLUID PURIFICATION SYSTEM

(75) Inventors: Dror Niv, Ramat Gan (IL); Michael Levitzky, Beer Sheva (IL)

(73) Assignee: Ecozone Technologies Ltd., Kadima (IL)

( * ) Notice: Subject to any disclaimer, the term of this patent is extended or adjusted under 35 U.S.C. 154(b) by 384 days.

(21) Appl. No.: 10/108,562

(22) Filed: Mar. 29, 2002

(65) Prior Publication Data

US 2002/0153241 A1 Oct. 24, 2002

Related U.S. Application Data

(60) Provisional application No. 60/281,011, filed on Apr. 4, 2001.

(51) Int. Cl.[7] ................................................ B01J 19/08

(52) U.S. Cl. .................................. 422/186.04; 204/164

(58) Field of Search ...................... 422/186.04; 204/164

(56) References Cited

U.S. PATENT DOCUMENTS 6,730,275 B2 * 5/2004 Sharma et al. ......... 422/186.04

* cited by examiner

*Primary Examiner*—Kishor Mayekar
(74) *Attorney, Agent, or Firm*—Edward Langer; Shiboleth, Yisraeli, Roberts, Ziaman & Co.

(57) ABSTRACT

A dielectric barrier discharge plasma reactor device for plasma-based gas and liquid purification. The device comprises a series of electrodes arranged in rows of alternating polarity so as to form a series of triangular modules in which the spacing between adjacent electrodes is less than or equal to the diameter of an individual electrode. When an electrical power supply is connected to the electrodes, an electrical discharge is produced which reacts with the constituents of the fluid to produce activated radicals. The device further comprises a fluid swiveling device which facilitates homogenous flow of the contaminated fluid through the reactor by providing effective mixing between activated radicals and fluid, such that toxins contained in the fluid are attacked and decomposed by the radicals. A number of alternative embodiments of the fluid swiveling device are described.

19 Claims, 17 Drawing Sheets

Fig.1 Crisscross Structure

Crisscross Structure
Cross-Section

SECTION A - A
A
A
+
-
12
14
14a
14b
16
16a
16b
20
22
24

Single electrode

Swiveler

Fig.7a
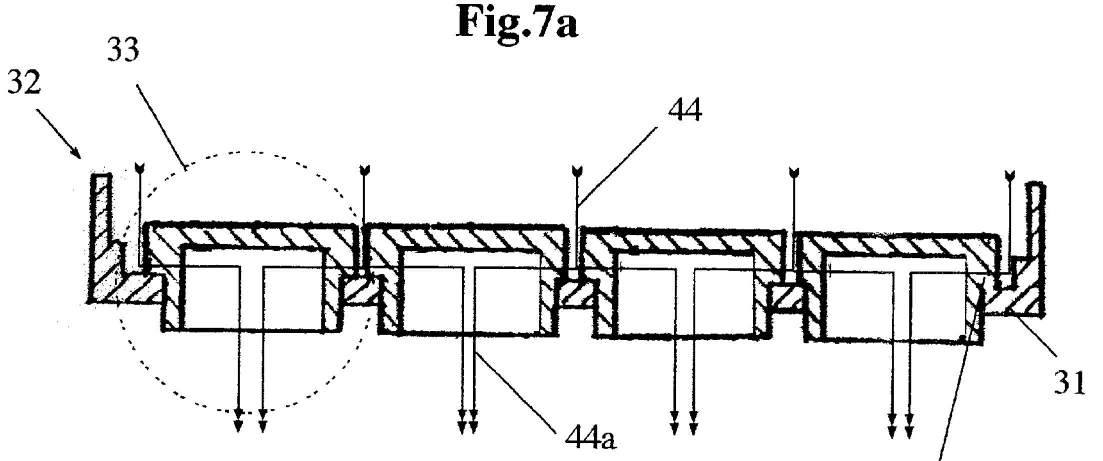
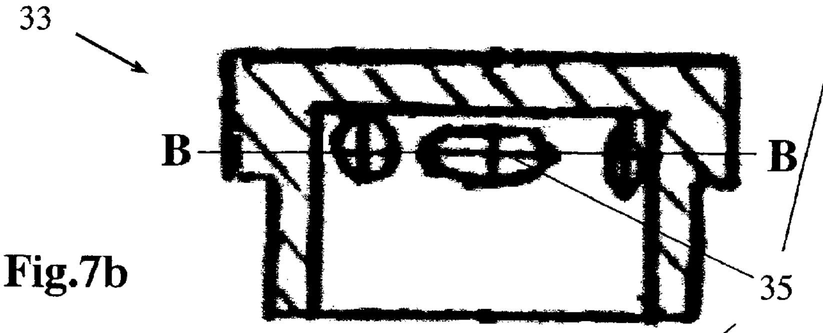
Fig.7b
B-B
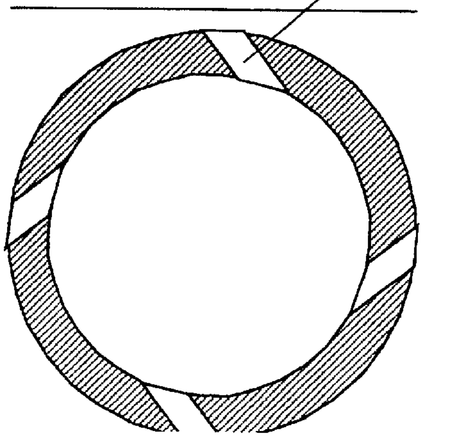
Fig.7c

DIELECTRIC BARRIER DISCHARGE FLUID PURIFICATION SYSTEM

This application claims the benefit of U.S. Provisional Application No. 60/281,011, filed Apr. 4, 2001, which are hereby incorporated by reference.

FIELD OF THE INVENTION

The present invention relates to corona reactors, and more particularly, to a plasma reactor of the dielectric barrier discharge type and its use in plasma-based gas and liquid purification.

BACKGROUND OF THE INVENTION

Plasma may be defined as an electrically conducting medium in which there are roughly equal numbers of positively and negatively charged particles, produced when the atoms in a gas become ionized. It is sometimes referred to as the fourth state of matter, distinct from the solid, liquid and gaseous states.

When energy, such as heat, is continuously applied to a solid, it first melts, then it vaporizes and finally electrons are removed from some of the neutral gas atoms and molecules to yield a mixture of positively charged ions and negatively charged electrons, while overall neutral charge density is maintained. When a significant portion of the gas has been ionized, its properties will be altered so substantially that little resemblance to solids, liquids and gases remains. A plasma is unique in the way in which it interacts with itself, with electric and magnetic fields and with its environment. A plasma can be thought of as a collection of ions, electrons, neutral atoms and molecules, and photons in which some atoms are being ionized simultaneously with other electrons recombining with ions to form neutral particles, while photons are continuously being produced and absorbed.

Plasma may be produced in a discharge tube, which is a closed insulating vessel containing a gas at low pressure through which an electric current flows when sufficient voltage is applied to its electrodes.

Normally, air consists of neutral molecules of nitrogen, oxygen and other gases, in which electrons are tightly hound to atomic nuclei. On application of an electric field above a threshold level, some of the negatively charged electrons are separated from their host atoms, leaving them with a positive charge. The negatively charged electrons and the positively charged ions are then free to move separately under the influence of the applied voltage. Their movement constitutes an electric current. This ability to conduct electrical current is one of the more important properties of plasma Plasma has been widely studied, different technologies have been developed to obtain different types of plasma and industrial applications have emerged.

The use of plasma as an inducer of chemical reactions and its application for treating gaseous, fluid pollutants and biological contaminants has been widely known for the past couple of decades. The catalyzing performance of plasma depends on its characteristics, which in turn depend on the type of discharge. The discharge itself depends on the shape of electrodes, on the nature of the inter-electrode region, on the voltage and current waveforms used for producing the plasma.

There are four known types of plasma production:

1. Electron beam.
2. Pulsed corona discharge.

3. Surface discharge.
4. Silent discharge (dielectric barrier corona discharge).

Treatment of air streams by dielectric barrier corona discharge is being developed as a cost effective and environmentally friendly alternative to conventional methods of air purification against a wide range of chemical and biological contaminants. Controlled reduction of the contaminant content is achieved by varying the discharge power and the contact time.

An electrical discharge is the passage of electrical current through a material that does not normally conduct electricity, such as air. On application of a high voltage source, the normally insulating air is transformed into a conductor, a process called electrical breakdown, and sparks, which are a form of electrical discharge, fly.

There are several types of electrical discharges:

1. The corona, which is a ‘partial’ discharge occurring when a highly heterogeneous electric field is imposed. Typically, a very high electric field is present adjacent to a sharp electrode, and a net production of new electron-ion pairs occurs in this vicinity. The corona typically has a very low current and very high voltage.
2. The glow discharge, which typically has a voltage of several hundred volts, and currents up to 1 Amp. A small electron current is emitted from the cathode by collisions of ions, excited atoms and photons, and then multiplied by successive electron impact ionization collisions in the cathode fall region.
3. The arc discharge, which is a high current, low voltage discharge, in which electron emission from the cathode is produced by thermionic and/or field emission.

Gas phase corona reactor (GPCR) technology enables the use of electrical discharges in order to accelerate (heat up) electrons to very high energies, while the rest of the gas stays at room temperature. The energized electrons attack background gas molecules producing highly reactive radicals such as [O], [OH], [N], etc., which in turn decompose various air contaminants.

Volatile organic compounds (VOCs) are an example of common air pollutants released in a number of industrial processes. Emission of VOCs is conventionally controlled by techniques such as thermal oxidation, catalytic oxidation, activated carbon adsorption, bio-filtration, etc. These technologies are generally expensive and have high energy requirements. Growing world concern for environmental protection has promoted testing and evaluation of a number of alternate techniques for abatement of VOCs.

Non-thermal plasma generated by GPCRs has developed as a cost effective and environmentally friendly method for destroying VOCs. The majority of the electrical energy applied to the reactor goes into the production of energetic electrons rather than into producing ions and heating the ambient gas, which is a more efficient and cost-effective method of decomposing toxic compounds than conventional methods.

Non-thermal plasma is highly effective in promoting oxidation, enhancing molecular dissociation and producing free radicals that cause the enhancement of chemical reactions, thereby converting pollutants to harmless by-products.

GPCRs of the dielectric barrier discharge (DBD) type have historically been used to produce industrial quantities of ozone, which have been used in the air and water purification fields. In ozone-based air purification, contaminated fluid is brought into contact with ozone (produced by various methods) while in plasma-based air purification the contaminated fluid is driven through a corona reactor and exposed to plasma. Plasma purification has the advantage of being able to treat extremely difficult compounds such as perfluorocarbons. Plasma purification is also more efficient than ozone purification, providing removal of a significantly greater weight of contaminant per unit energy input.

The conventional design of DBD utilizes a 2-electrode system (grounded tube and inner conducting wire) wherein one or both of the electrodes are covered by an insulating layer preventing arcing across the capacitive barrier by the charge build up. Most of the energized electrons are generated in close proximity to the wire resulting in a small effective plasma volume.

A major factor determining efficiency of a plasma based gas purification device is the structure of the gas flow through the electrodes. The most effective way of increasing efficiency is to lengthen the residence time of the fluid flow within the space between the electrodes in which the electrical discharge occurs. Increasing the time during which the discharge is able to act upon the fluid results in increased detoxification of the fluid, thus improving the quality of purification.

Various methods have been described for lengthening residence time of a gas in an ozone generator. U.S. Pat. No. 5,518,698 to Karlson et al describes an ozone generator in which the resident time for the gas within the generator is increased by lengthening the route for the movement of gas flow between electrodes which are shaped as two coaxial cylinders. The gas is introduced into the annular passageway between the electrodes at an angle so that it swirls in a cyclonic flow path as it travels from one end of the passageway to the other, thereby lengthening the path along which the generated ozone acts upon the gas.

U.S. Pat. No. 5,855,856 to Karlson describes an ozone generator having two concentric electrodes, a vortex chamber installed in front of the ozone generator entrance, with an annular clearance between the electrodes serving as the outlet from the chamber.

In the above designs, the gas flow rate through the ozonizer is limited by the size of the annular clearance between the electrodes, which reduces the amount of treatment the gas receives. The structure of the gas flow described in these designs features low turbulence, which does riot enable the layers in the gas flow to intermix effectively, thereby decreasing the effectiveness of the gas treatment by the discharge-generated ozone.

U.S. Pat. No. 6,027,701 to Ishioka et al. describes an ozone generator which includes a block of electrodes arranged in several rows placed in sequence one after the other. The gas is acted upon by the ozone as it passes through clearances between the electrodes. In this design the high velocity of the gas flow in the entrance chamber of the ozoniser results in a relatively short residence time.

In some plasma generators, a high-voltage electric field is passed through a packed bed of dielectric pellets to form non-thermal plasma in the void spaces between the pellets. The pellets serve to increase the residence time of contaminants in the reactor. These pellets create a high resistance to the gas flow, resulting in a substantial overall pressure drop, necessitating the use of a high power blower and requiring the reactor chamber to be of relatively large dimensions.

U.S. Pat. No. 5,637,198 to Breault describes a volatile organic compound reduction apparatus comprising a reactor-efficient coronal discharge zone and at least one pair of high-dielectric coated electrodes. However, in this system the electrodes are spaced sufficiently far apart to enable untreated compound to pass through areas of minimum energy density between electrodes.

Therefore it would be desirable to provide a dielectric barrier device for efficiently removing a wide range of contaminants from a fluid, in which energy density, effective plasma volume, and residence time of contaminants in the reactor are high, and in which exposure of the fluid to the electrodes in the reactor is homogeneous.

SUMMARY OF THE INVENTION

Accordingly, it is an object of the present invention to overcome the disadvantages of the prior art and provide a dielectric barrier discharge device for converting pollutants in a fluid stream to harmless by-products, wherein electrical discharge is homogeneously distributed within the device. The system is designed to achieve maximum exposure of contaminants to the electrodes of the device, and contaminants have a high residence time within the reactor.

According to a preferred embodiment, there is provided a system for detoxification of contaminated fluids by use of non-thermal plasma produced by dielectric gas phase corona discharge. The system comprises a housing, a corona discharge reactor and an air swiveling device. The reactor comprises upper and lower frame elements, each having a conducting and non-conducting portion and a plurality of cylindrical electrodes. The electrodes are arranged in rows of alternating polarity, so as to form a series of triangular modules, such that the spacing between adjacent electrodes is less than or equal to the diameter of an individual electrode. Each electrode consists of a conducting element surrounded by an insulating jacket. The fluid swiveling device facilitates prolonged exposure of the contaminated fluid to the reactor. When an electrical power supply is connected to the electrodes, a substantially uniform electrical discharge is produced, which reacts with the constituents of the fluid to produce activated radicals. The fluid swiveling device provides effective mixing between activated radicals and fluid, such that toxins and biological contaminants contained in the fluid are attacked and decomposed by the radicals.

A feature of the present invention is the provision of a dielectric barrier discharge device in which the electrical discharge is homogenous and in which exposure time of a fluid to the electric field, and of radicals to the fluid, is high.

An advantage of the present invention is that exposure of contaminants to the areas proximate the electrodes, which have the highest energy density, is maximized.

A further advantage of the present invention is that residence time within the reactor is increased.

A further advantage of the present invention is that energy density within the reactor is high.

A further advantage of the present invention is that a wide range of chemical and biological contaminants can be treated.

A further advantage of the present invention is that cooling can be achieved by passage of oil through the electrode.

A further advantage of the present invention is that arcing is prevented by presence of oil surrounding regions of electrical connections.

A further advantage of the present invention is that a greater weight of contaminant can be removed per unit energy input compared to other known methods.

A further advantage of the present invention is that high temperatures are not required therefore enabling rapid start-up and low maintenance costs.

A further advantage of the present invention is that it is cost-effective and environmentally friendly.

Additional features and advantages of the invention will become apparent from the following drawings and description.

BRIEF DESCRIPTION OF THE DRAWINGS

For a better understanding of the invention with regard to the embodiments thereof, reference is made to the accompanying drawings, in which like numerals designate corresponding sections or elements throughout, and in which:

FIG. 7*a* is a horizontal cross-section of the swiveling device;

FIG. 7*b* is a cross-section of a portion of the swiveling device;

FIG. 7*c* is a vertical cross section of the swiveling device;

DETAILED DESCRIPTION OF THE PREFERRED EMBODIMENTS

Figure 1B:
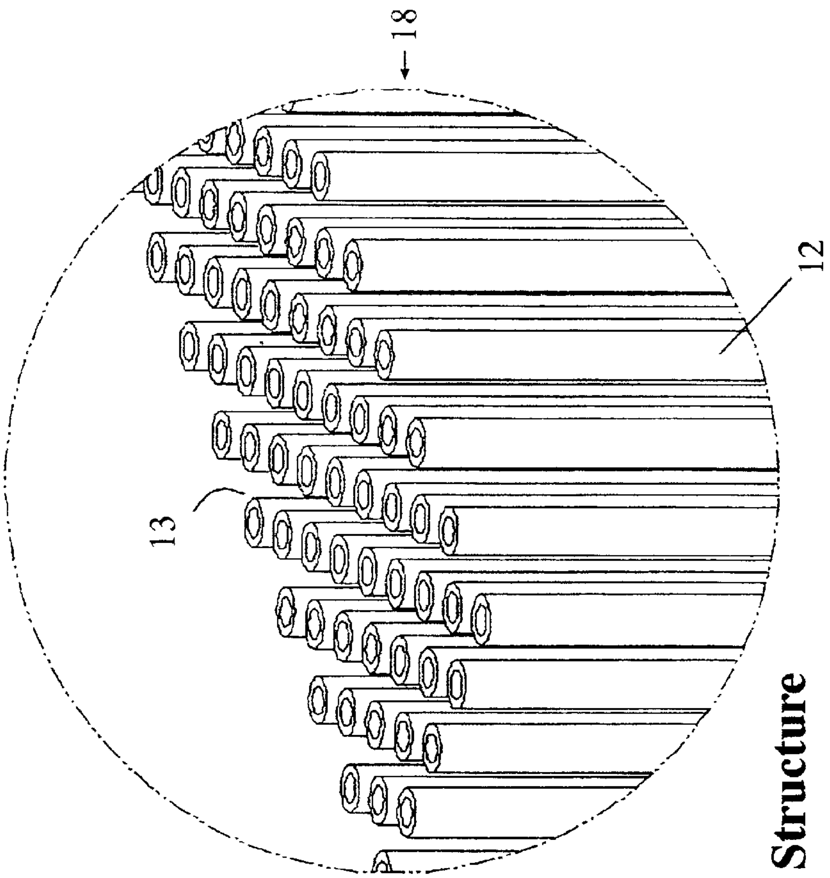
FIG. 1*b* is an enlarged view of a portion of the reactor core shown in FIG. 1*a.;*
Figure 1A:
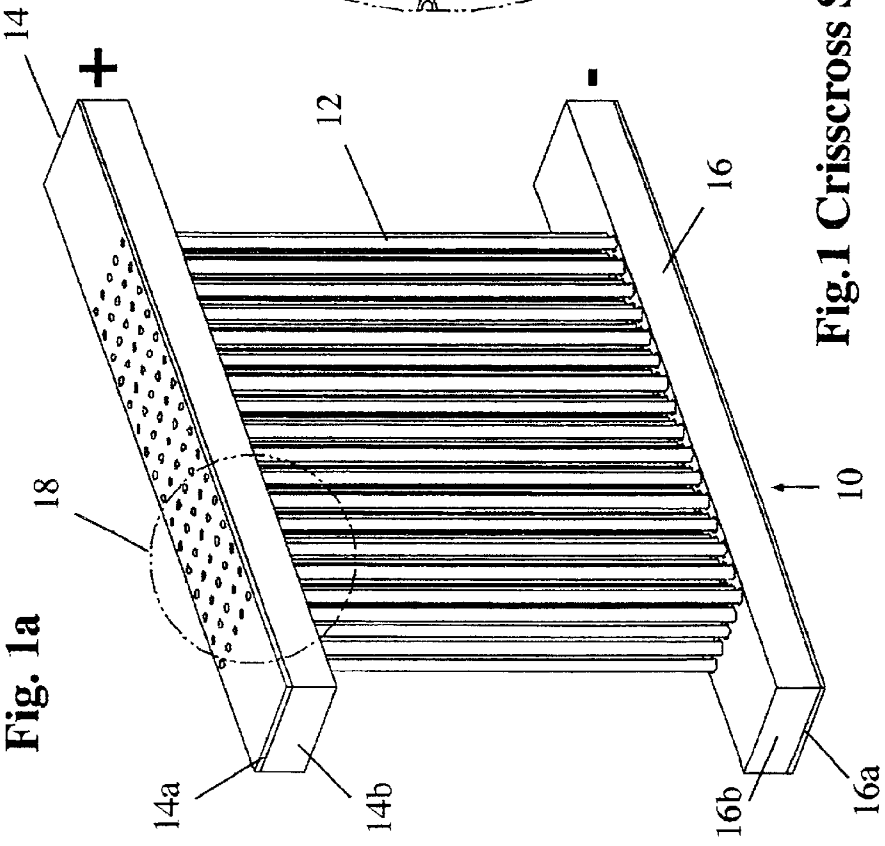
FIG. 1*a* is a general perspective view of a reactor core of a dielectric barrier discharge device, constructed and operated in accordance with the principles of the present invention.
Figure 8:
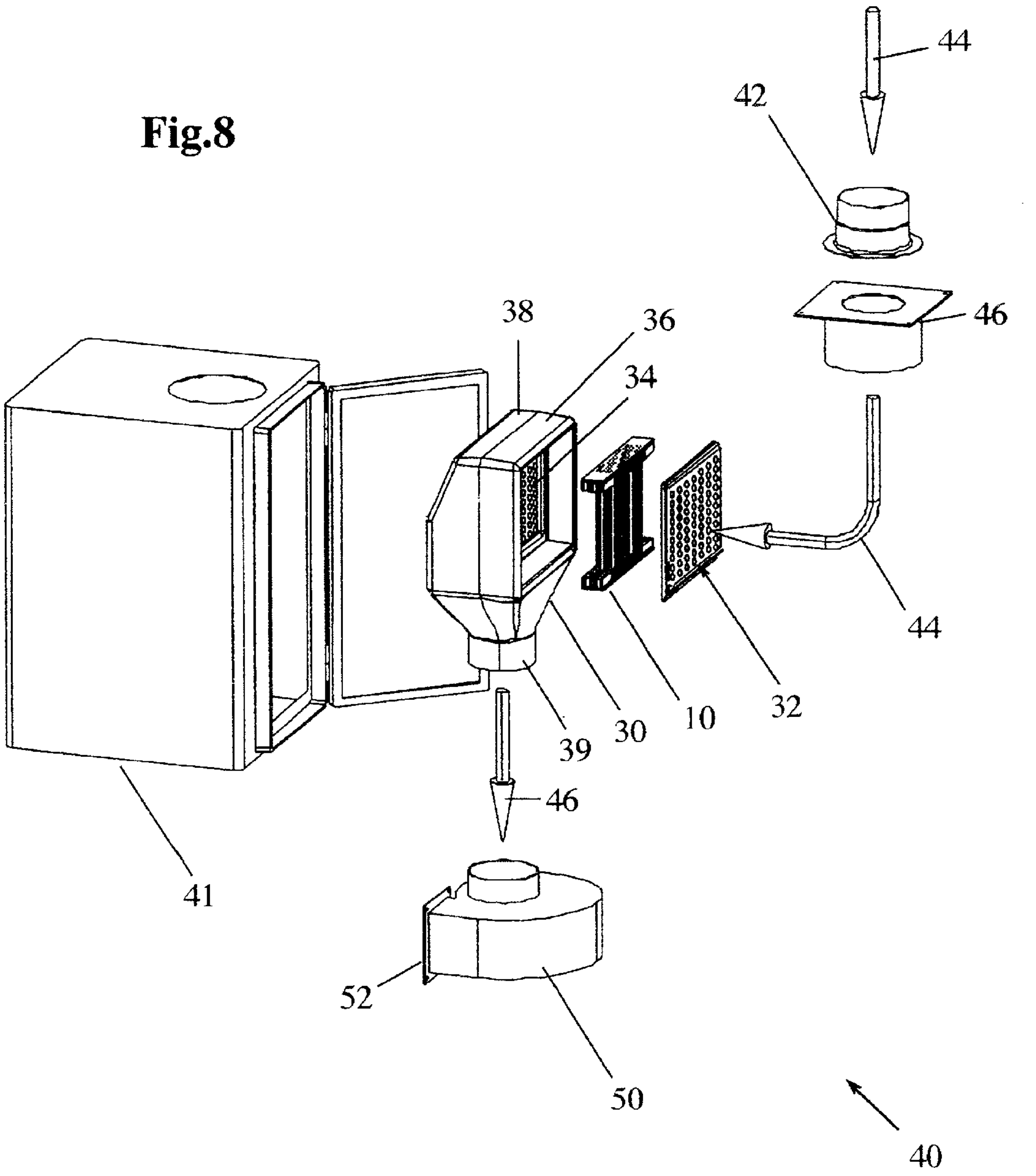
FIG. 8 is an exploded view of a system for causing breakdown of pollutants in a fluid stream.

Referring now to FIG. 1*a*, there is shown a perspective view of a dielectric barrier discharge gas phase corona reactor 10, constructed and operated in accordance with the principles of the present invention, for use in a plasma-based fluid decontamination system 40 (as shown in FIG. 8).

Reactor 10 comprises a plurality of electrodes 12 of common cross-sectional shape and equal cross-sectional dimensions, arranged in a generally parallel orientation to one another in a criss-cross array and connected to a high-voltage power supply. The power supply may be a direct current, or preferably an alternating current power supply in order to assist in keeping electrons suspended between electrodes to facilitate in the detoxification process. The power supply should be capable of producing potential difference between oppositely-charged terminals, preferably, but not necessarily, in the range 10–20 kV and frequency should be preferably but not necessarily in the range 50–1000 Hz.

Electrodes 12 are contained at their upper and lower ends by frames 14 and 16 respectively, which also serve as positive and negative terminals, respectively. Frames 14 and 16 each comprise an outer conducting layer, 14*a* and 16*a* respectively, and an inner non-conducting layer, 14*b* and 16*b* respectively. Non-conducting layers 14*b*, 16*b* may be formed from any insulating (non-conductive) material which is not attacked by plasma, has sufficient durability, and is temperature resistant, such as PVC, or preferably Teflon.

FIG. 1*b* shows an enlargement of a section 18 of FIG. 1*a*, in which the arrangement of the electrodes 12 can be seen more clearly. Electrodes 12 are arranged in a crisscross pattern with an air gap region 13 formed between adjacent electrodes 12.

By applying a high alternating voltage, preferably but not necessarily in the range of 10–20 kV, to electrodes 12, connected across terminals 14*a* and 16*a*, a high strength electric field is developed across the gap region 13 and a high energy density is developed within reactor 10.

When a polluted fluid is caused to flow through the gap region 13 in the electric field, a dielectric breakdown occurs in the fluid within the gap region 13 that creates a discharge. The discharge itself depends on the characteristics of electrodes, on the nature of the inter-electrode region, on the temperature, on the voltage and frequency, and on the current waveforms used for producing the plasma.

The electrical discharge accelerates electrons to very high energies. The energized electrons then collide with background gas molecules producing highly energetic ions and radicals ($O^{2-}$, $N^{2-}$, $OH^-$) inside reactor 10. These products are directly employed to dissociate and ionize the pollutants.

Figures 2, 2A, 2B, 2C:
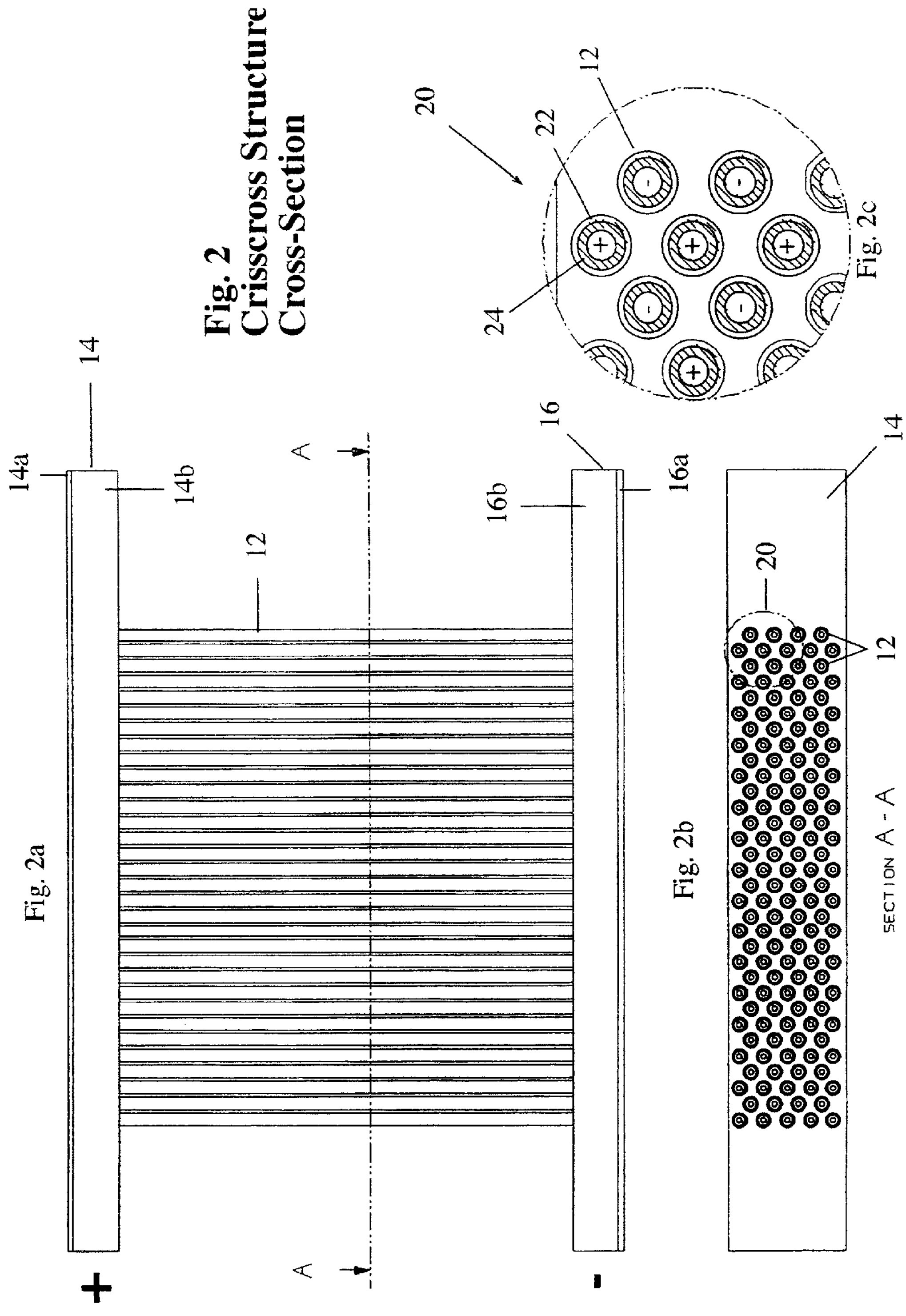
FIG. 2*a* is a front view of the reactor core of FIG. 1*a;*
FIG. 2*b* is a top view of a cross-section of the reactor core of FIG. 1*a*, taken along section line A—A of FIG. 2*a;*
FIG. 2*c* is an enlarged view of a portion of the reactor core shown in FIG. 2*b;*
Figure 3A:
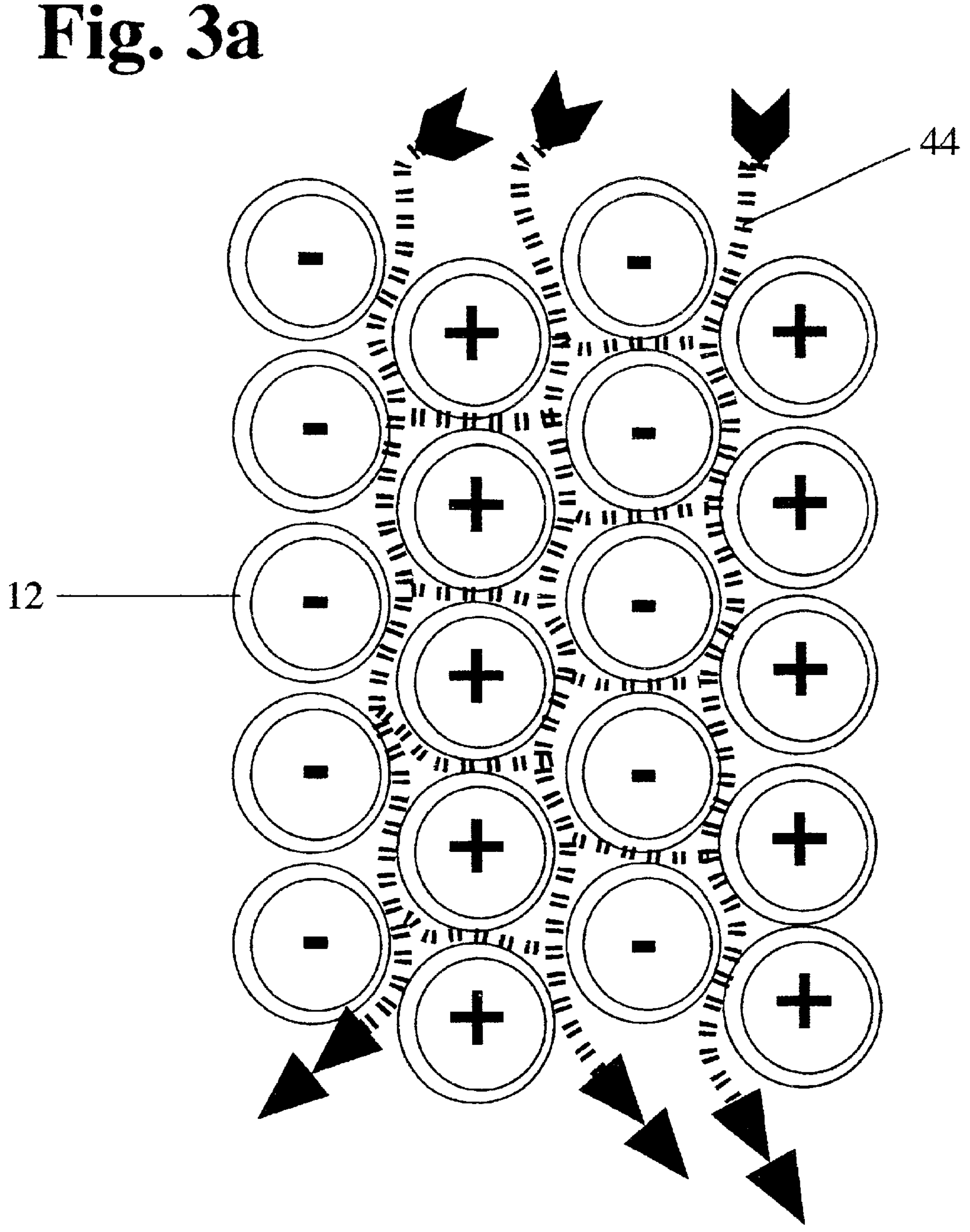
FIG. 3*a* is a top view of the arrangement of electrodes and direction of fluid flow in the reactor core.
Figure 3B:
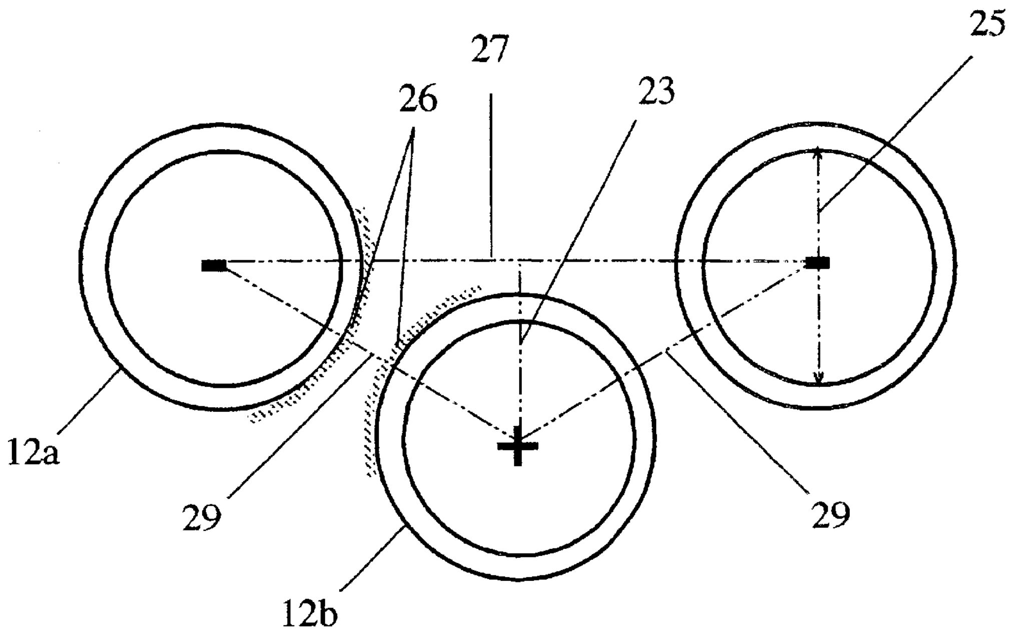
FIG. 3*b* is a top view of a triangular module of electrodes.

Referring now to FIGS. 2*a–c* and FIGS. 3*a,b*, the arrangement of electrodes 12 of reactor core 10 is further illustrated. FIG. 2*a* shows a front view of reactor 10, comprising electrodes 12 contained within frames 14 and 16. FIG. 2*b* shows a cross-sectional top view of reactor 10, showing electrodes 12 contained within frame 14. FIG. 2*c* shows an enlargement of a section 20 of FIG. 2*b* in which the arrangement of the electrodes 12 can be more clearly seen. FIG. 3*a* shows the arrangement of adjacent electrodes of opposite charge and the direction of fluid flow between them, and FIG. 3*b* shows the triangular arrangement of a set of three electrodes.

Figure 4:
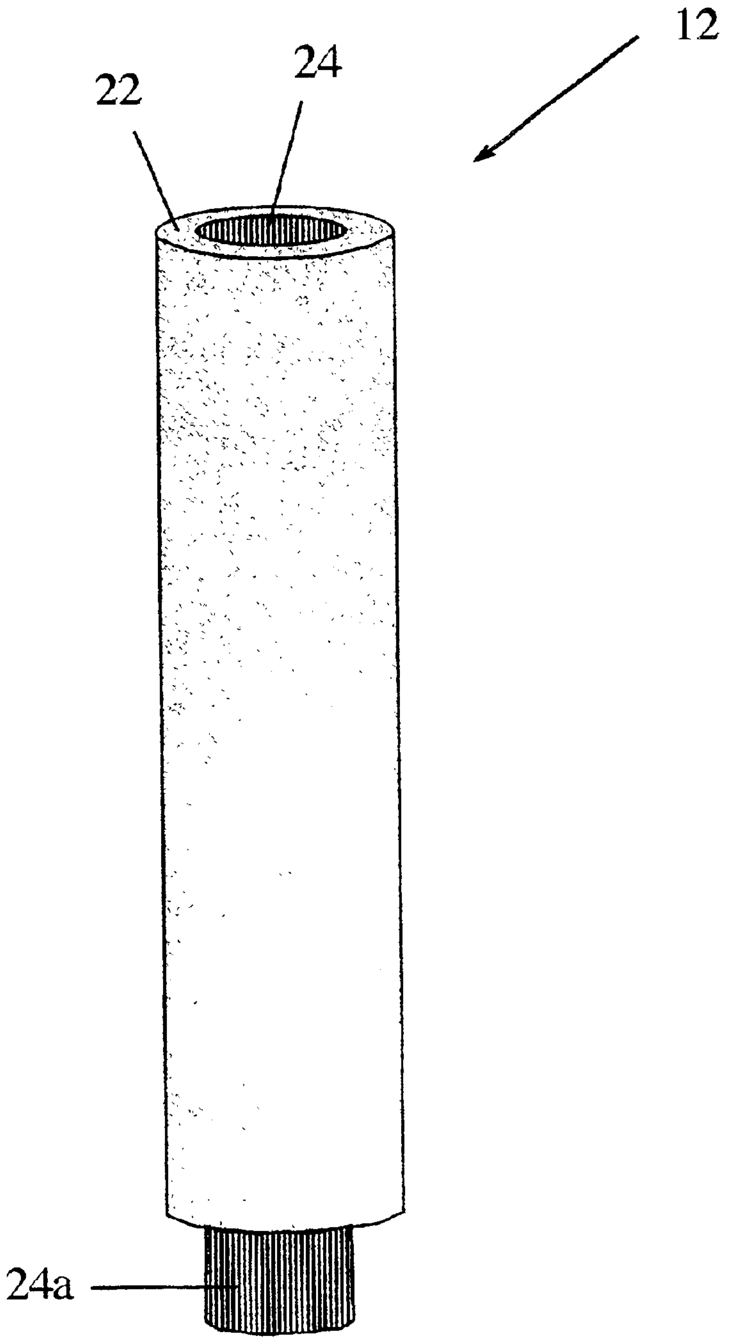
FIG. 4 is a front view of a single electrode of the reactor core.

As seen in FIG. 4, each electrode 12 comprises a hollow dielectric tube 22 within which is provided a conductive layer 24. Electrodes 12 are arranged as adjoining modules of three electrodes, with each three set at fixed distances so as to form an isosceles triangle between inversely charged cross-pairs of electrodes (FIG. 3*b*). The addition of single electrodes (anode or cathode, depending on placement) to the base tri-electrode module creates yet another module, up to an infinite number of modules. Electrodes 12 are charged so that every two diagonally adjacent electrodes are inversely charged, i.e. every positively charged electrode is surrounded by negatively charged electrodes and vice versa.

In dielectric barrier systems, the energy density at a given voltage is inversely proportional to the distance between pairs of electrodes of opposite polarity. There is a significant drop in energy density as spatial separation from a discharge point is increased, such that energy levels become significantly lower even at points a short distance away from a discharge point. In the multi-electrode crisscross array of the present invention, the geometrical placement of the electrodes increases the efficiency of the system via two parameters which influence this efficiency.

Firstly, the distance between adjacent electrodes 12 is less than the diameter of the electrodes in order to ensure that the gas is exposed to sufficiently high energy density at any point between electrodes. Greater separation distance results in an energy level below a critical minimum in the region between electrodes, enabling contaminated fluid to pass insufficiently treated through this area, which is undesirable.

Secondly, the separation between adjacent electrodes 12 defines individual discharge volumes between electrodes. With each electrode 12*a*, 12*b* having opposite polarity, a multitude of electrical discharge paths is formed from each electrode to its adjacent electrodes across adjacent reaction volumes, such that the gas can flow from one discharge volume to the next in series. The geometrical arrangement of electrodes therefore creates a "pinball" flow path forcing the fluid into close proximity with the electrode surfaces, which comprise "hot zones" of high energy. This arrangement also increases the residence time of the gas in reactor 10 without significantly increasing the size of the system.

Figure 6:
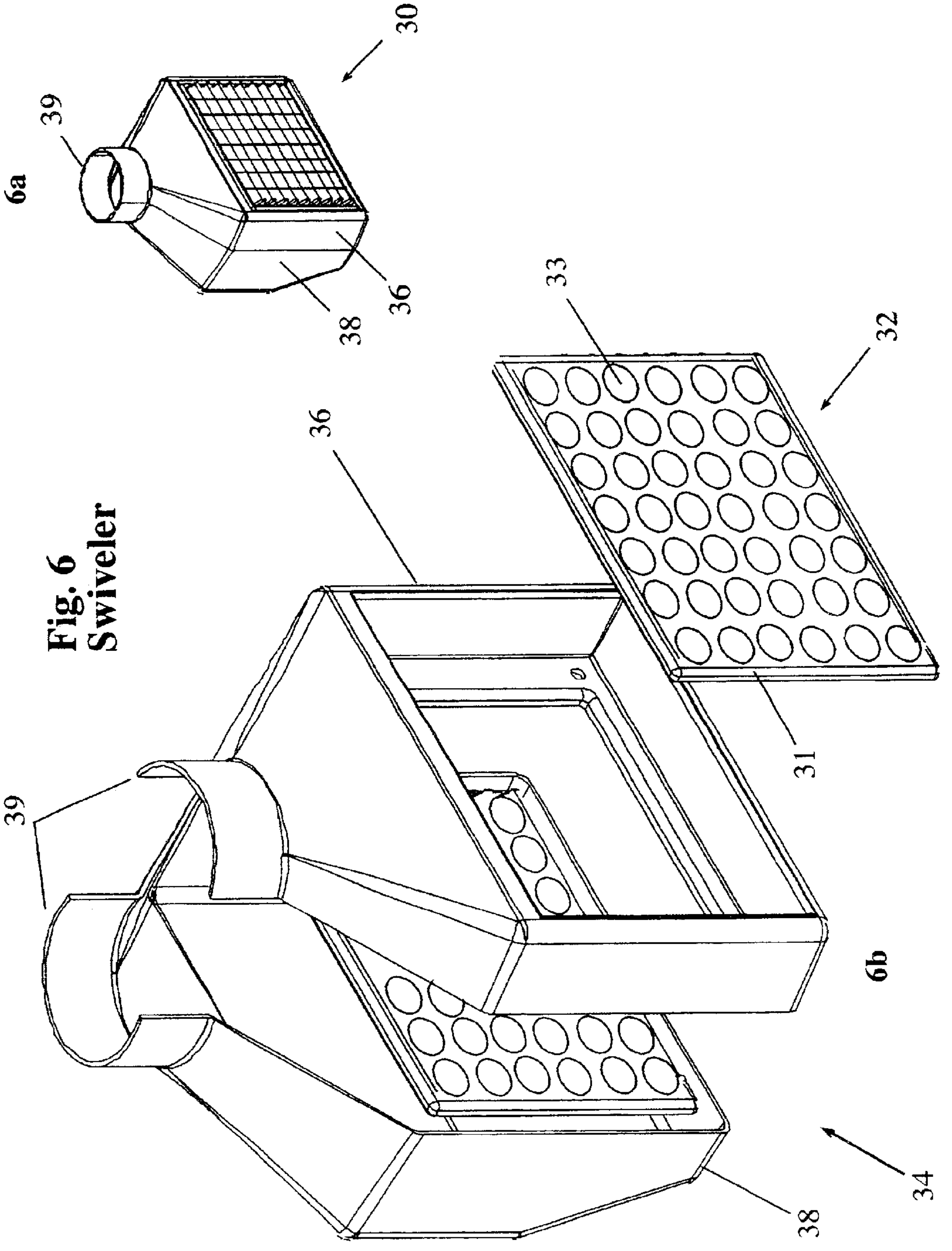
FIG. 6*a* is a perspective view of a fluid swiveling device.
FIG. 6*b* is an exploded view of a fluid swiveling device.

In the preferred embodiment shown in FIG. 3*a*, a gas stream 44 enters reactor 10 in a direction substantially perpendicular to the longitudinal axis of electrodes 12. An initial swiveler 32 (illustrated in FIGS. 6 and 7) causes a 90 degree swiveling of the gas flow 44, resulting in turbulence and homogenous exposure of the contaminated gas to electrodes 12. The gas 44 may include water vapor, oxygen, nitrogen, argon and may be entrained with toxic compounds including, but not limited to volatile organic compounds (VOCs), chiorofluorocarbons (CFCs), perfluorocarbons (PFCs), halons, sulfur and nitrogen compounds, ammonia and various biological contaminants.

In the multi-electrode crisscross array of the present invention the gas flowing through reactor 10 is manipulated by both the electrode geometry placement and the swiveling effect so as to proximally and concurrently expose the fluid to a plurality of high energy density discharge zones.

FIG. 3*b* shows the arrangement of the basic triangular module formed by three electrodes set at fixed distances so as to form an isosceles triangle between inversely charged cross-pairs of electrodes, in which the height 23 of the triangle is less than the diameter 25 of each electrode. The distance 29 between the centers of each pair of oppositely charged electrodes forms two sides of an isosceles triangle, while the distance 27 between the two similarly charged electrodes forms the base of the triangle.

FIG. 4 illustrates a preferred embodiment of a single electrode 12 of reactor 10. Electrode 12 comprises a hollow tube of conductive material 24, such as, but not limited to, silver nitrate $AgNO_3$, surrounded by an insulating jacket 22, formed from a material such as, but not limited to, ceramic or borosilicate glass, having a high dielectric constant. Conductive tube 24 has one end 24*a* extending beyond insulating jacket 22. In alternative embodiments of electrode 12, the conductive material may comprise metallic wire, film or powder, carbon wire or film and electricity conducting liquids and gels, that may or may not extend beyond the dielectric material. Electrode 12 may be open at both ends, or may be sealed at one end by an extension of dielectric material 22.

Electrodes 12 are arranged within frames 14 and 16 (shown in FIGS. 1*a* and 2*a*) in alternating rows (as seen in FIG. 3*a*). Positively charged electrodes are arranged with conducting end 24*a* in contact with conducting layer 14*a* of the frame 14, which serves as a positive terminal, and insulating jacket 22 in contact with non-conducting layer 16*b* of frame 16. Similarly, negatively charged electrodes are arranged with end 24*a* in contact with conducting layer 16*a* of frame 16, providing a negative terminal, and insulating jacket 22 in contact with non-conducting layer 14*b* of frame 14.

Figure 5:
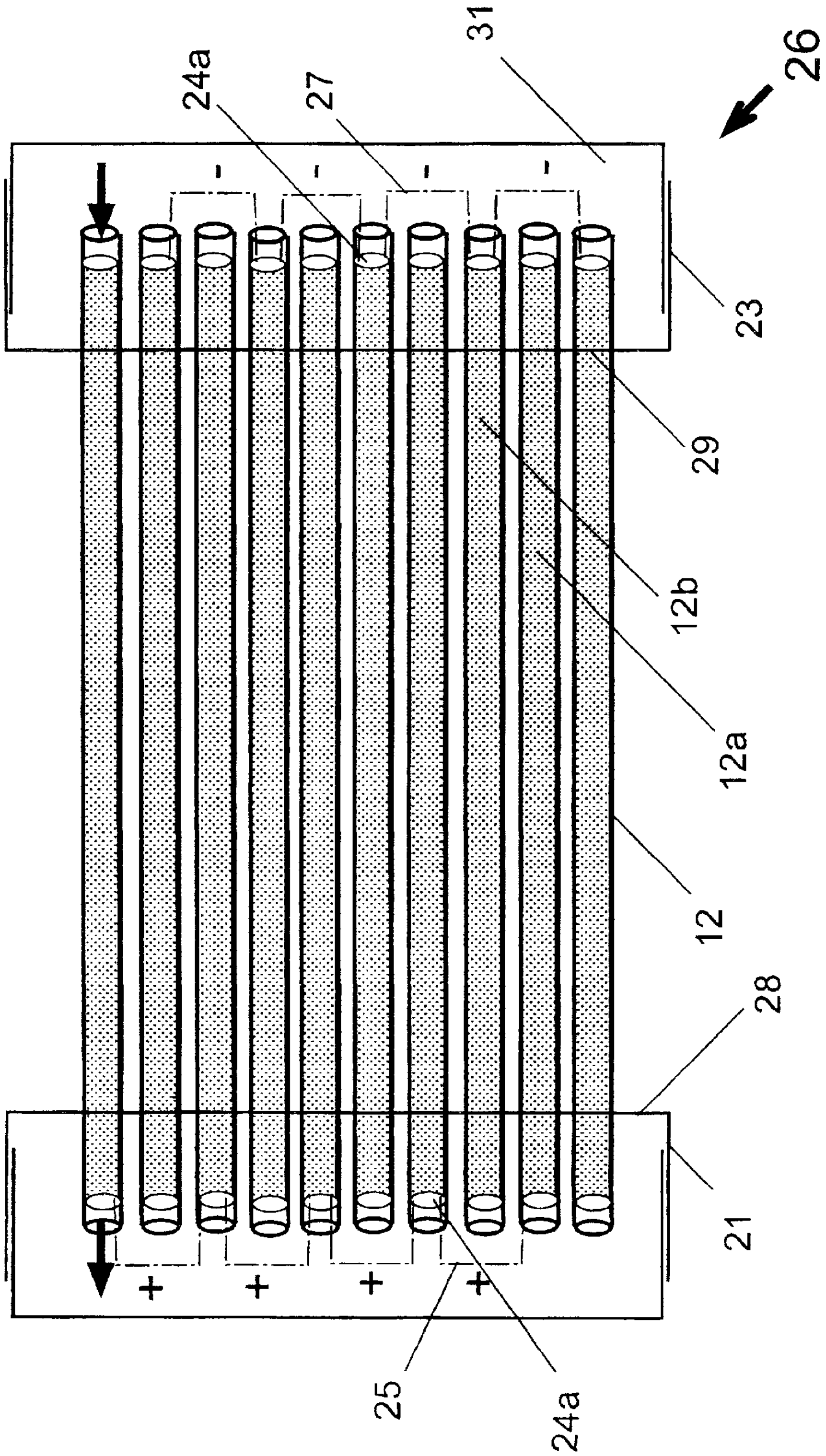
FIG. 5 is a front view of an alternative embodiment of the reactor core.

In an alternative embodiment of a reactor core 26 shown in FIG. 5, electrodes 12 are arranged within hollow frames 21 and 23. Each frame 21 and 23 is provided with an inwardly-facing surface 28, in which are formed a series of holes 29, arranged in rows. Each hole 29 has a diameter equivalent to that of the outer circumference of electrodes 12, such that electrodes 12 are insertable within, and held in place by, holes 29. Electrodes 12 are arranged within holes 29 in alternating rows of opposite polarity, (as shown in FIG. 3*a*), in an arrangement which is essentially similar to that shown in FIGS. 1*a* and 2*a* with regard to frames 14 and 16 of reactor 10.

Positively charged electrodes 12*a* are arranged with conducting end 24*a* connected by wiring 25 to equally potentialized rows of electrodes. Similarly, negatively charged electrodes 12*b* are arranged with end 24*a* connected by wiring 27 to equally potentialized rows of electrodes. The electrical properties of the liquid placed within the vessel frames prevents the fatal possibility of arching between the exposed electrode ends.

Reactor 26 enables cooling to be carried out by passage of a fluid 31, such as silicon oil utilized in high voltage transformers. Fluid 31 is placed within frames 21 and 23 and is passed through the hollow center of electrode 12 in order to enable temperature control of the system. Alternatively, passage of fluid 31 may occur through an air gap (not shown) between conductive material 24 and jacket 22, Passage of fluid 31 may be achieved by a pump and heat exchange unit (not shown).

The presence of an insulating fluid, such as silicon oil, has the further advantage of preventing oxidation of the electrode surface which may occur as a result of an air gap (not shown) remaining between conductive material 24 and jacket 22 (shown in FIG. 4). This is a common problem in non-thermal plasma systems.

An additional advantage of fluid cooling is that it provides a solution to the problem of electrical arcing between exposed anode and cathode potentials by providing an insulating barrier.

FIGS. 6*a, b* show an embodiment of a two-part swiveler system 30 which is provided to increase turbulence and resident exposure time of contaminants within reactor 10, thereby increasing the efficiency of the decontamination process. Swiveler system 30 comprises an initial swiveler 32 and a secondary swiveler 34, each comprising a series of vortex chambers 33 whose axes are perpendicular to electrodes 12, arranged in parallel rows and columns within a flame 31. Initial swiveler 32 causes increased collision between opposed high velocity fluid streams, resulting in the creation of a swiveling fluid flow at a 90-degree angle with respect to their original flow path. Secondary swiveler 34 assures homogenous and aggressive mixing of radicals and the stream of contaminated fluid.

Initial swiveler 32 is positioned along one face of a housing section 36. Secondary swiveler 34 is situated within a second housing section 38 such that housing sections 36 and 38, containing swivelers 32 and 34, together with reactor 10, can be combined to form swiveler system 30. Reactor 10 is situated behind initial swiveler 32 within housing section 36.

Swiveler system 30 is formed with a fluid outlet 39.

Gas flow through swiveler system 30 can be more clearly seen in FIG. 7*a*. High velocity gas stream 44 enters vortex chambers 33 from a number of directions via inlet channels 35. As gas flow 44 passes through vortex chamber 35 it receives a tangential component to its velocity and arrives at the first row of electrodes 12 as several swirling streams 44*a* according to the number of vortex chambers 33. These swirling streams form a flow path which passes over the entire width of the electrodes 12, thus increasing the exposure time of the gas to electrodes 12 and residence time of the gas within the system 40 (as shown in FIG. 8).

As the gas passes the first row of electrodes 12, the tangential component of the gas is broken up, resulting in a multitude of vortices in the flow and in high turbulence. This, together with the increased gas residence time, results in a high level of gas layer mixing, yielding a high level of gas purification. Further gas flow through the block of electrodes 12 is accompanied by pressure drops comparable to pressure drops by gas flow with axial velocity. Therefore the additional pressure drops resulting from installation of vortex chambers in the entrance chamber to the plasma generator do not exceed 15%.

FIG. 7*b* illustrates an enlargement of an individual vortex chamber 33 of swiveler 32, showing inlet channels 35. FIG. 7*c* is a horizontal cross-section of a vortex chamber 33 taken along the section line B—B of FIG. 7*b*, in which the inlet channels 35 can be seen.

FIG. 8 shows the fluid decontamination system 40 based upon non-thermal plasma separation by a dielectric barrier discharge gas phase corona reactor. System 40 comprises an outer housing 41, provided with an opening within which an adaptor 42 may be positioned. Contaminated fluid stream 44 initially passes through a micron filter 46, which removes particles from the gas. Fluid stream 44 then encounters initial swiveler 32, which causes gas stream 44 to be swiveled by 90 degrees, creating turbulence and increasing the residence time of the gas within reactor 10 in which decontamination occurs. The efficiency of the decontamination process is further increased by secondary swiveler 34 which causes strong mixing between radicals produced in reactor 10 and fluid stream 44.

Swivelers 32 and 34, together with reactor core 10 are contained within housing 30, comprising housing sections 36 and 38, and provided with an outlet 39 for decontaminated gas 46. Decontaminated gas 46 is sucked out of housing 30 by a blower 50 and expelled through outlet 52.

Adaptor 42, filter 46, swiveler housing 30 and blower 50 are situated within general housing 41, which is formed with an opening for outlet 52 of blower 50, through which decontaminated gas passes out of system 40.

Figure 9A:
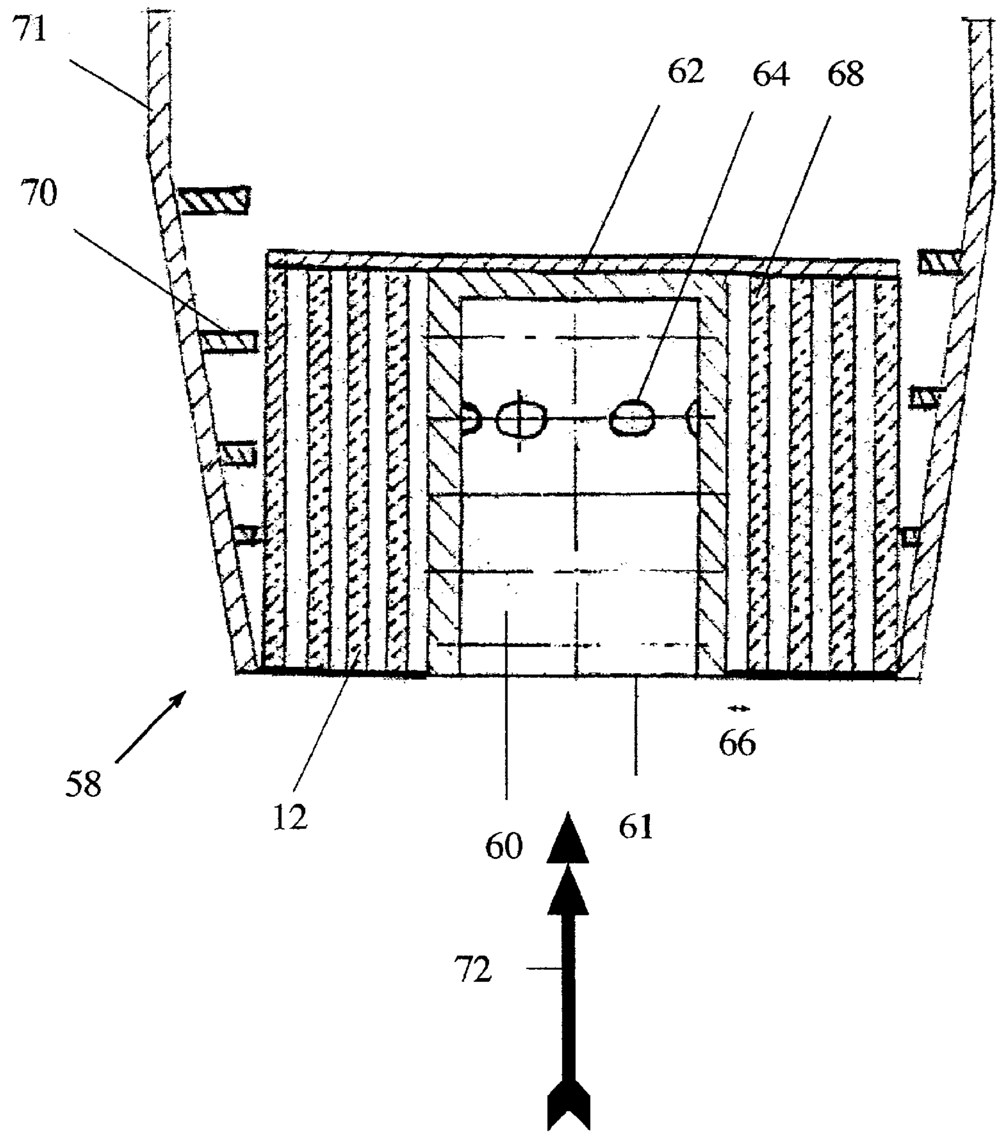
FIG. 9*a* is a cross-sectional side view of an alternative arrangement of a reactor core and air-swiveling system.

FIG. 9*a* illustrates an additional alternative embodiment of the present invention, comprising fluid decontamination system 58 in which contaminated fluid is fed into a central tube 60, which is open at one end 61 and closed at the other end 62. Tube 60 is provided with apertures 64 at fixed equal distances along its length, to enable homogenous dispersal of fluid.

The total area of the vertical cross-sections of the apertures 64 is greater than or equal to the area of central tube 60 to ensure optimal pressure balancing.

The angle at which apertures 64 are aligned to the longitudinal axis of tube 60 causes swiveling of fluid as it exits tube 60 via apertures 64.

Figure 9B:
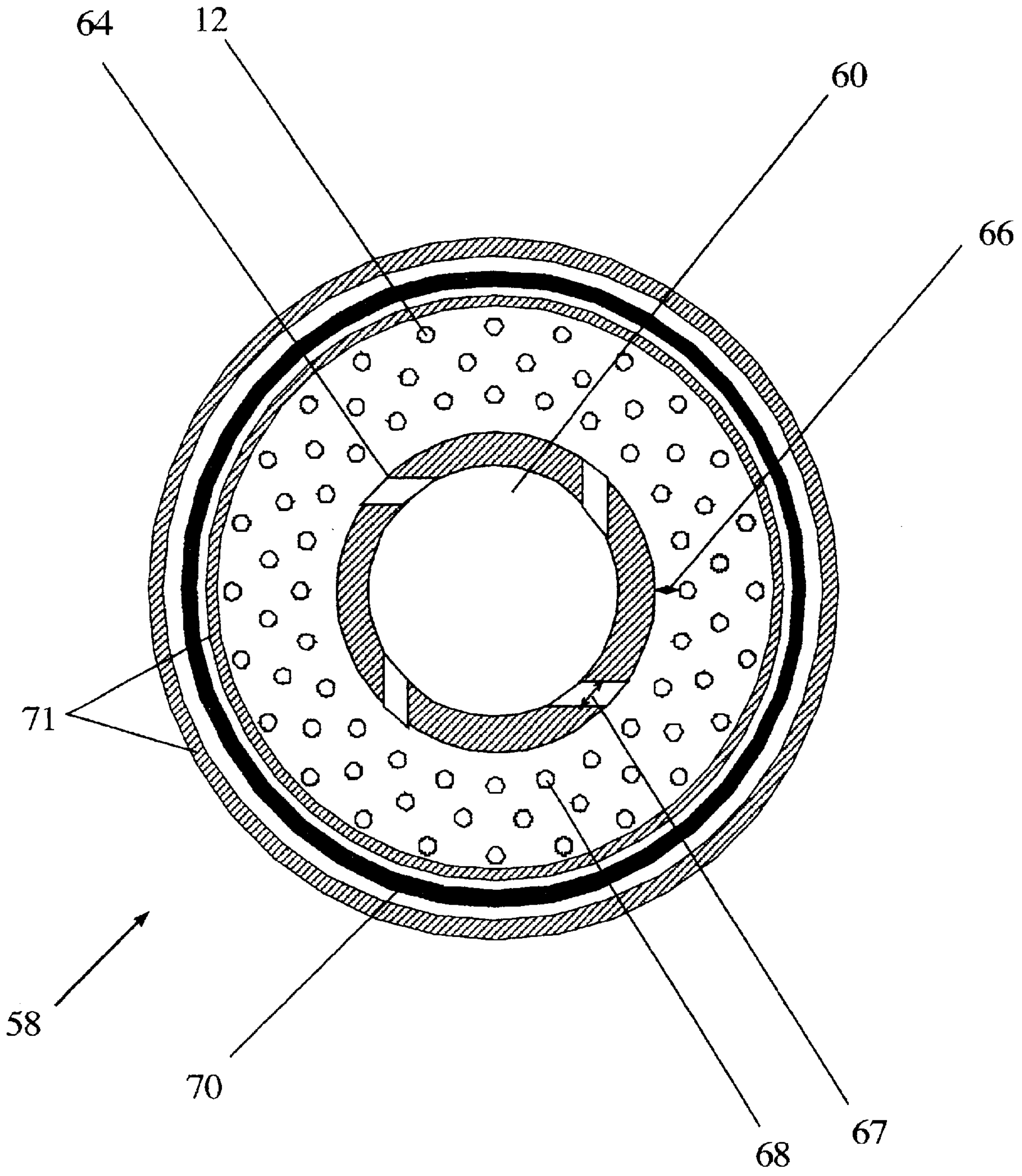
FIG. 9*b* is a cross-sectional top view of the arrangement of FIG. 9*a;*

Electrodes 12 are arranged in a series of concentric rings of increasing diameter around tube 60, such that the distance 66 between tube 60 and the first ring of electrodes 68 is equivalent to one quarter of the aperture diameter, as illustrated in FIG. 9*b*, and such that alternate rows are oppositely charged. As described above with reference to embodiment 10, electrodes 12 are arranged as a multitude of triangular modules in which the distance between oppositely charged electrodes is less than the diameter of the electrodes. Electrodes 12 are connected at each end to frames (not shown) having similar structure and function to either frames 14 and 16 described above with reference to FIG. 1*a*, or to frames 21 and 23. with reference to FIG. 5.

System 58 is enclosed within an outer casing 71.

A secondary swiveling system 70 is positioned around the electrode ring of greatest diameter to produce mixing of radicals with contaminated fluid. In the embodiment shown in FIGS. 9*a–c* and 11*a–b*, secondary swiveler 70 comprises fins provided on the inner side of casing 71. The fins of secondary swiveler 70 cause layers to be formed in the fluid, which swirl into each other in the direction of exhaust 75.

Figure 9C:
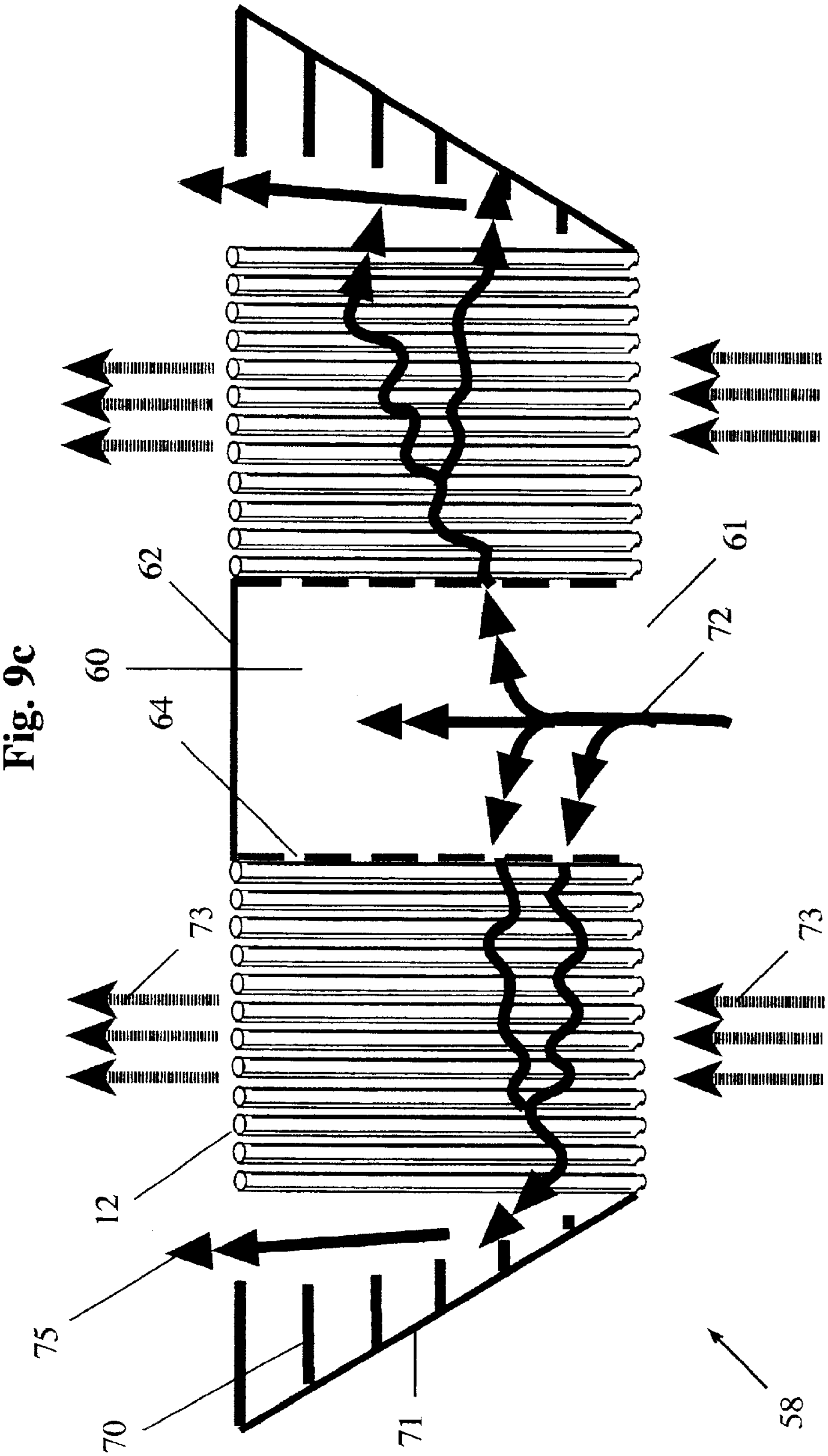
FIG. 9*c* is a schematic representation of the arrangement of FIG. 9*a;*

FIG. 9*c* illustrates the direction of fluid flow in the system 58 of FIGS. 9*a,b*. Contaminated fluid 72 enters open end 61 of tube 60 and is prevented from exiting freely by closed end 62. Fluid 72 passes out of tube 60 via apertures 64, which cause swiveling of the fluid stream. Air/oil cooling may be carried out through the hollow centers of electrodes 12 in order to maintain temperature control.

Figure 10:
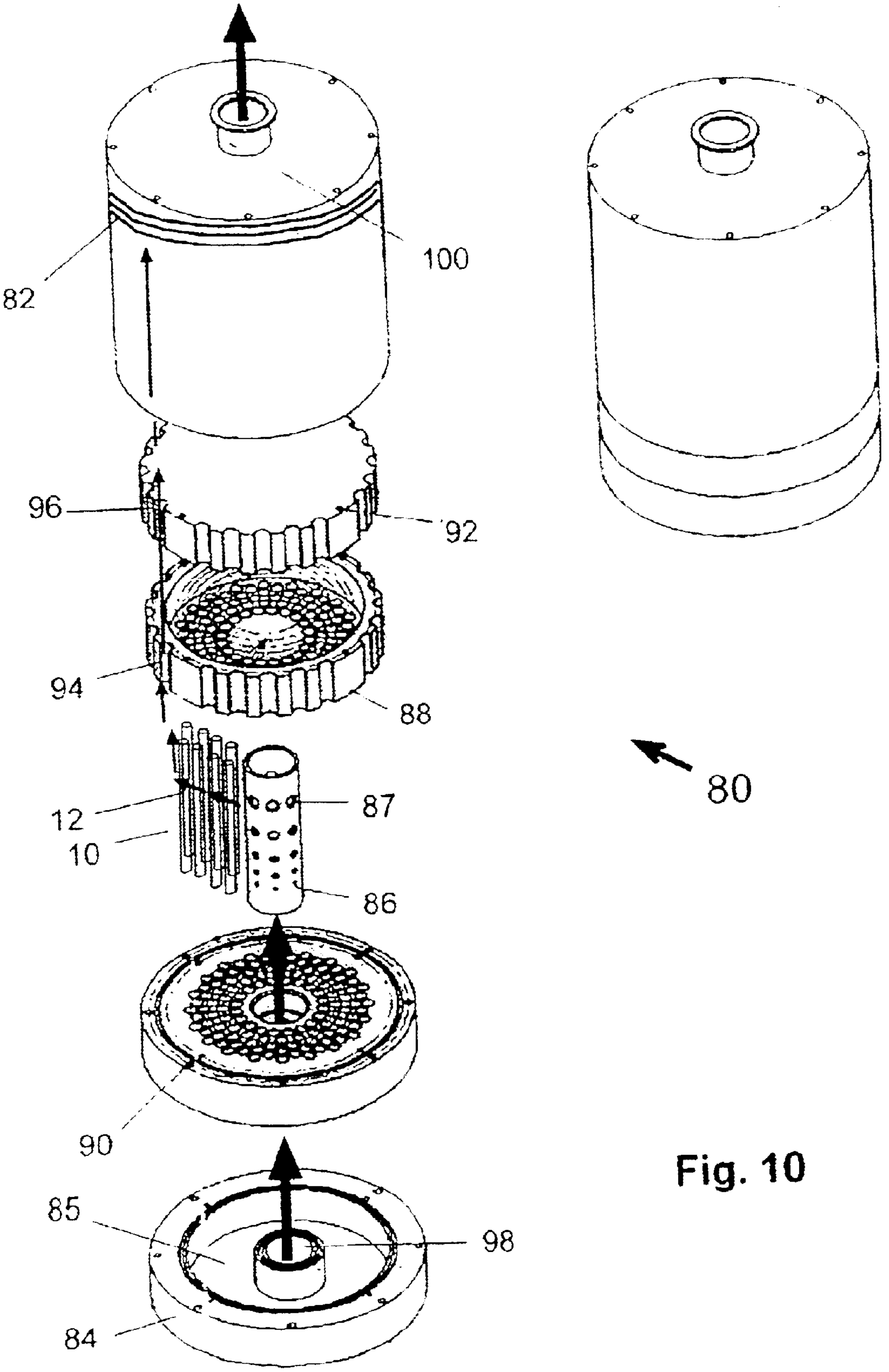
FIG. 10 is an exploded view of an alternative embodiment of the system of FIG. 8.

FIG. 10 illustrates an alternative embodiment of the present invention, comprising fluid decontamination system 80.

System 80 comprises a cylindrical outer housing 82, having a detachable cover 84, a cylindrical initial swiveler 86 provided with apertures 87 at fixed equal distances along its length, to enable homogenous dispersal of fluid, and a plurality of electrodes 12 arranged in a concentric manner, of increasing diameter around swiveler 86. Electrodes 12 are arranged such that adjacent concentric rows have alternating charge.

Electrodes 12 are contained at their upper and lower ends within frames 88 and 90 respectively, which also serve as positive and negative terminals, respectively, as described above with reference to FIG. 5.

Upper frame 88 is provided with beveled edges 94. A frame cover 92 is positioned over upper frame 88. Frame cover 92 is provided with beveled edges 96 which correspond to beveled edges 94 of upper frame 88, such that frame cover 92 may be fitted onto frame 88. Beveled edges 94 and 96 produce a series of gaps between upper frame 88 covered by frame cover 92, and the inner wall of outer housing 82. Frame cover 92 is positioned within outer housing 82 such that a gap remains between the inner upper surface of housing 82 and the upper surface of cover 92.

Cover 84 is provided with an opening 98 within which an adaptor (not shown) may be positioned. The adaptor is substantially identical to adaptor 42 of FIG. 8. Cover 84 is further provided with an inner depression, surrounding opening 98, which may serve as a reservoir for containing oil for use in cooling the system.

Contaminated fluid stream 44 initially passes through a micron filter (not shown), such as filter 46 seen in FIG. 8, which removes particles from the gas. Fluid stream 44 enters initial swiveler 86, and is prevented from exiting freely by upper frame cover 92. Fluid 44 therefore passes out through apertures 87, resulting in the creation of turbulence and increasing the residence time of the gas within the reactor.

The efficiency of the decontamination process is further increased by upper cover 92 which serves as part of the secondary swiveler, together with the inner surface of housing 82. Passage of fluid through the gaps provided between beveled edges 96 of frame cover 92 and edges 94 of upper frame 88, and between the inner surface of housing 82 cause layers to be formed in the fluid, which swirl into each other in the direction of outlet 100.

Decontaminated gas 46 sucked out of housing 82 via outlet 100 by a blower (not shown). Gas 46 is able to pass out of the reactor core 10 through the gaps formed between the beveled edges 94 and 96, respectively, of upper frame 88 and frame cover 92.

Figure 11A:
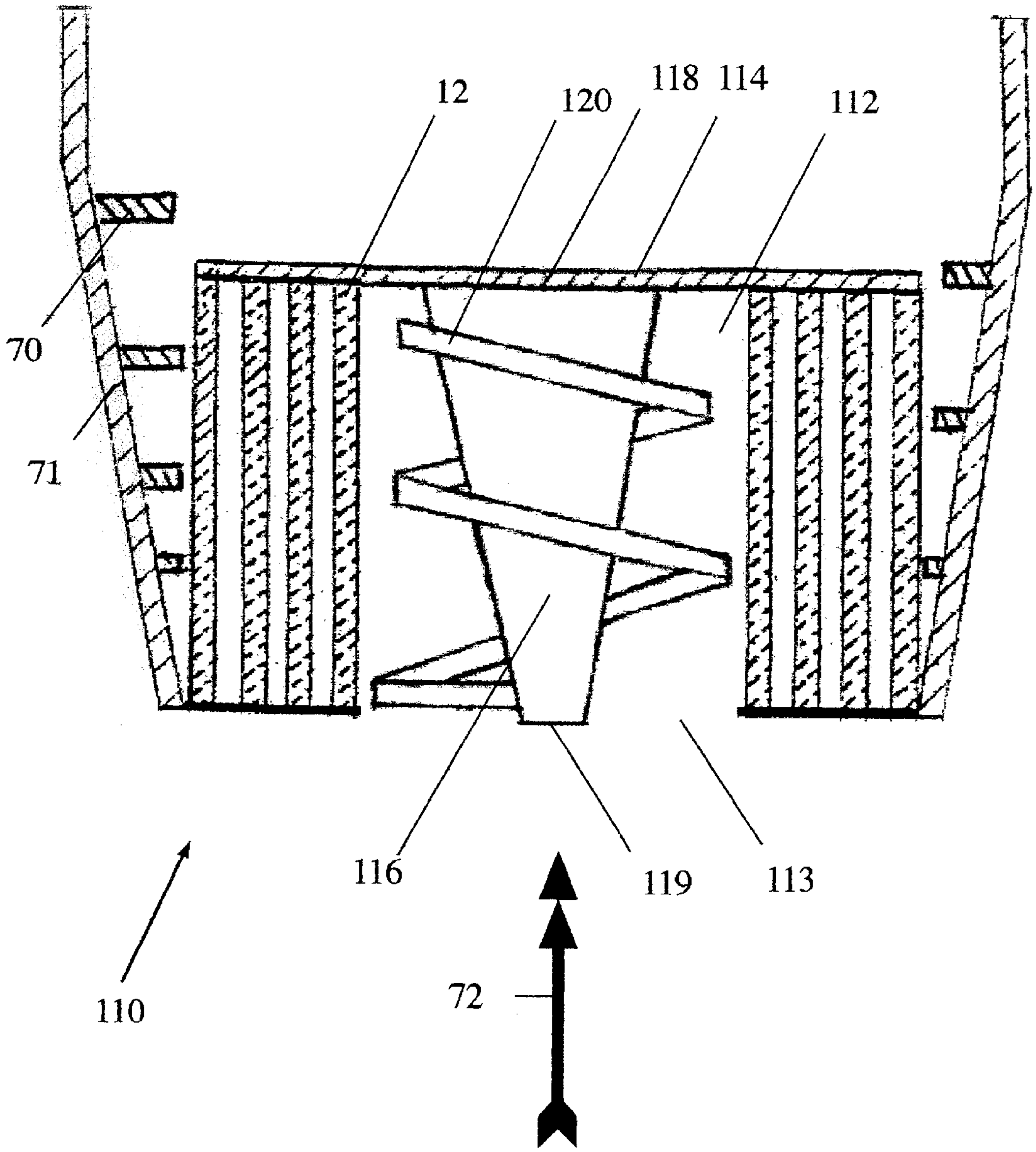
FIG. 11*a* is a cross-sectional view of a further alternative arrangement of a reactor core and air-swiveling system.

In a further alternative embodiment of the present invention, comprising fluid decontamination system 110, as shown in FIG. 11*a*, contaminated fluid 72 is fed into the tubular region 112 at the center of a series of concentric rings of electrodes 12 of increasing diameter, in which alternate rows are oppositely charged. As described above with reference to system 40, electrodes 12 are arranged as a multitude of adjacent triangular modules, in which the distance between oppositely charged electrodes is less than the diameter of the electrodes.

Electrodes 12 are connected at each end to frames (not shown) having similar structure and function to frames 14 and 16 described above with reference to FIG. 1*a* or preferably as shown FIG. 5.

Region 112 is open at one end 113 and closed at the other end 114. A cone 116 is placed within region 112 with its base 118 positioned at the closed end 114, and its sharp end 119 at the open end 113, thus causing the flow direction of the fluid 72 to be altered by 90 degrees, resulting in a flow which is essentially perpendicular to the axis of electrodes 12. Cone 116 is provided with turbulence wings 120 which create a vortex, thereby swiveling the fluid in the direction of the first ring of electrodes. System 110 is enclosed by an outer casing 71.

Figure 11B:
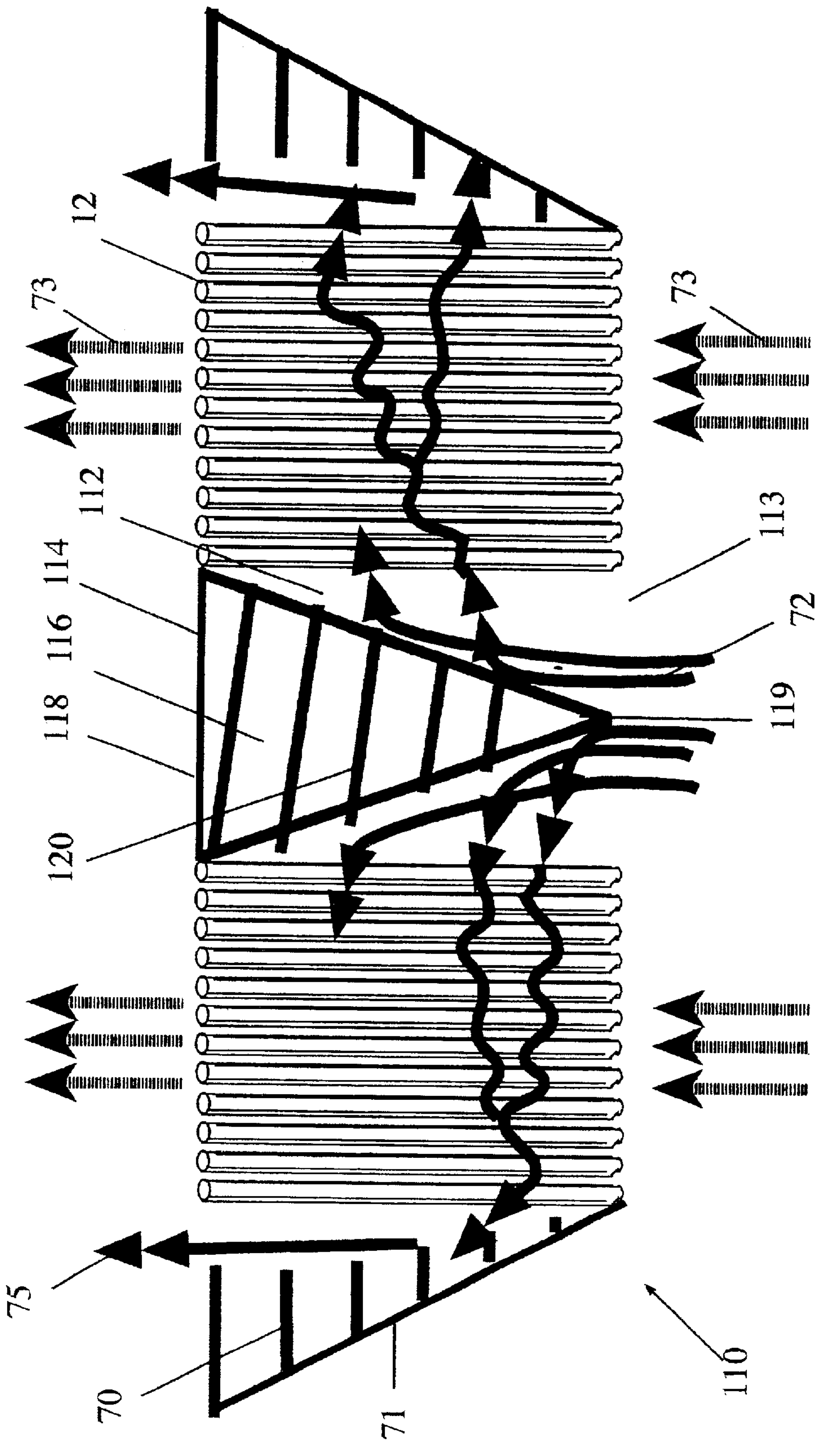
FIG. 11*b* is a schematic representation of the arrangement of FIG. 11*a;*

FIG. 11*b* further illustrates flow of fluid 72 through system 110. Contaminated fluid 72 enters open end 113 of tubular region 112 formed by the innermost ring of electrodes 12. Fluid 72 encounters turbulence wings 120 which cause the fluid stream to be swiveled in a direction essentially perpendicular to the longitudinal axis of electrodes 12.

Figure 12A:
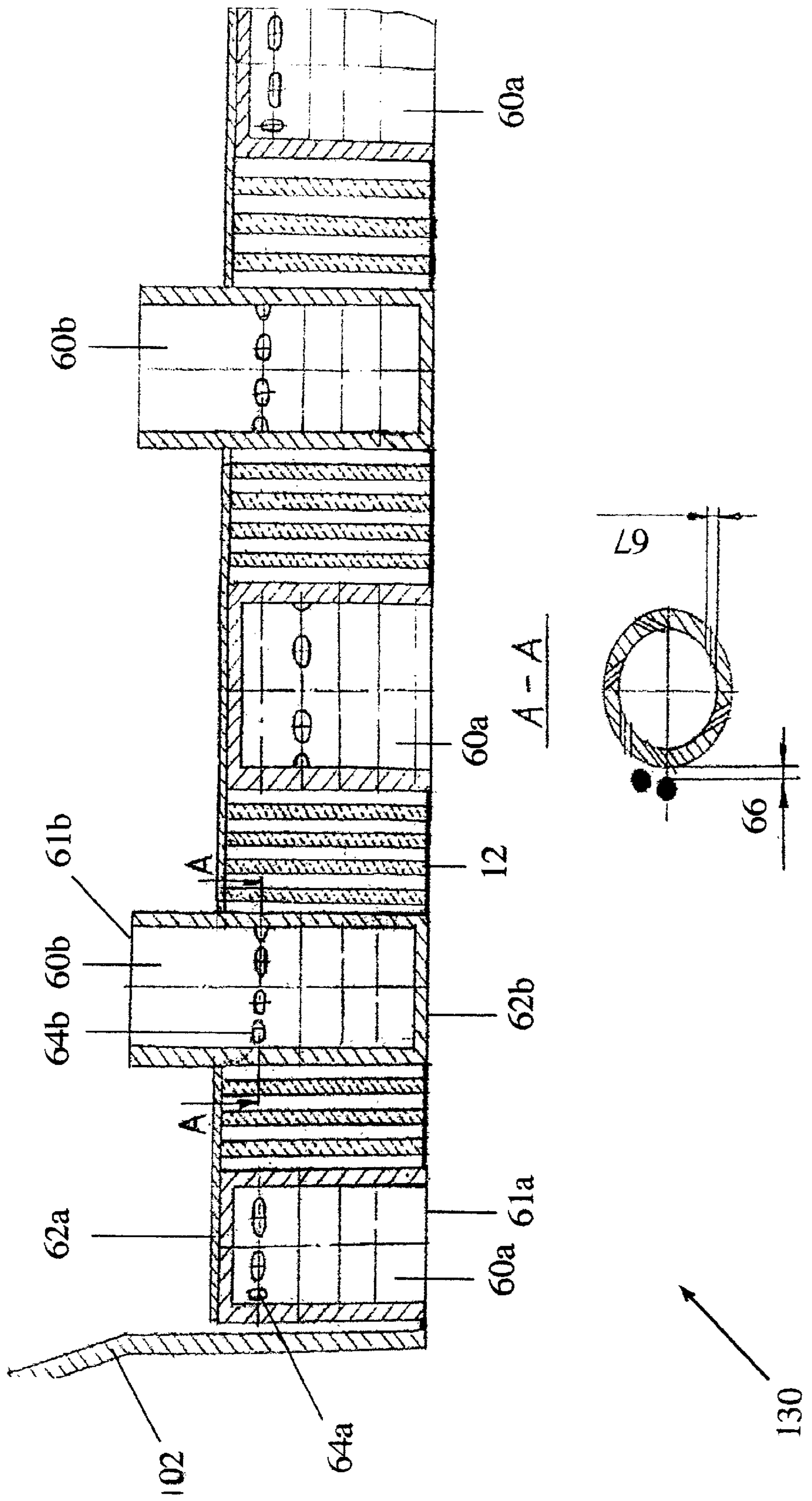
FIG. 12*a* is a cross-sectional view of an additional further embodiment of a reactor core and air-swiveling system.
Figure 12B:
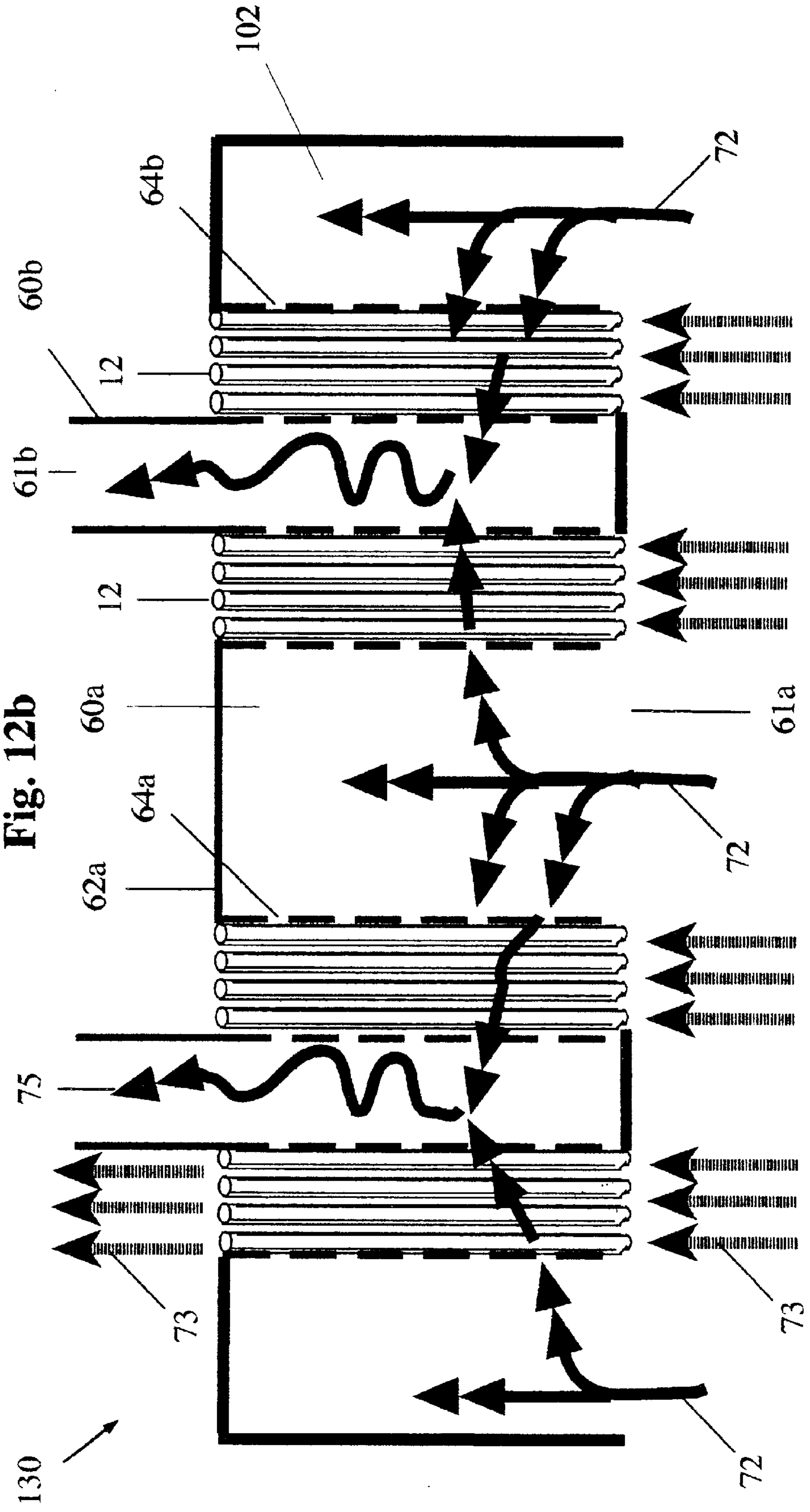
FIG. 12*b* is a schematic representation of the arrangement of FIG. 12*a*.

In yet another embodiment of the present invention, comprising decontamination system 130, shown in FIGS. 12*a–b* a series of tubes 60*a* are arranged in sequence, each tube 60*a* having an open end 61*a* and a closed end 62*a*. Each tube 60*a* is provided with apertures 64*a*, such that the tube 60*a* serves as an initial swiveler. Between each pair of tubes 60*a* is positioned a tube 60*b*, of greater length than tube 60*a*, formed with an open end 61*b* and a closed end 62*b*. Each tube 60*b* is arranged such that the closed end 62*b* is aligned with the open end 61*a* of tube 60*a* and the open end 61*b* is positioned beyond the closed end 62*a* of tube 60*a*. Tube 60*b* is formed with a series of apertures 64*b* such that tube 60*b* serves as a secondary swiveler.

Between each pair of adjacent tubes 60*a* and 60*b* is provided a series of electrodes 12 arranged in alternate rows of opposite charge. As with previous embodiments, electrodes 12 are arranged as a multitude of triangular modules in which the distance between oppositely charged electrodes is less than the diameter of the electrodes.

Electrodes 12 are connected at each end to frames (not shown) having similar structure and function to frames 14 and 16 described above with reference to FIG. 1*a* or preferably as shown in FIG. 5.

Decontamination system 130 is enclosed within a casing 122.

The direction of fluid flow for system 130 can be seen in FIG. 12*b*. Contaminated fluid 72 simultaneously enters each of the tubes 60*a* via open ends 61 a and is prevented from exiting freely by closed ends 62*a*. Fluid 72 therefore exits tube 60*a* through apertures 64*a*, positioned at equal distances along the length of tube 60*a*, resulting in swiveling of fluid stream 72.

The turbulent fluid stream 72 then passes through the sequence of electrodes 12, where dielectric breakdown and free-radical formation occur. The stream then enters secondary swiveler 60*b* via apertures 64*b*, which provide further swiveling, causing mixing of contaminated fluid and free radicals. Treated fluid is able to exit the system through open end 61*b* of tube 60*b*. Gas/oil cooling 73 of the system 100 is carried out through hollow electrodes 12.

The fluid decontamination system of the present invention may be applied to a gas or a liquid. In the case of a liquid, a source of gas such as air may be required to provide a gas flow which would be converted to an excited species flow by the electrical discharge produced in reactor 10, which would then travel through the liquid flow in a gas-stripping action. The gas flow through the liquid in reactor 10 would combine with and convert the contaminants in the liquid flow in a manner similar to that described above with reference to contaminated gases.

The present invention operates at ambient temperature, eliminating the need for the relatively high power which is required for systems which operate at elevated temperatures.

The decontaminating device of the present invention therefore provides an efficient and environmentally friendly method for removal of a wide range of contaminants from fluids.

Having described the invention with regard to certain specific embodiments thereof, it is to be understood that the description is not meant as a limitation, since further modifications will now suggest themselves to those skilled in the art, and it is intended to cover such modifications as fall within the scope of the appended claims.

We claim:

1. A system for purification of contaminated fluids by use of non-thermal plasma produced by dielectric gas phase corona discharge, said system comprising:

a housing provided with a fluid inlet and a fluid outlet;

a corona discharge reactor means arranged in said housing for passage of the contaminated fluids therethrough, said reactor means comprising:

upper and lower frame elements, and a plurality of spaced-apart oppositely charged electrodes being supported by said frame elements, arranged as a plurality of adjoining triangular modules, each of said electrodes having a conducting element surrounded by an insulating jacket, said plurality of electrodes being arranged perpendicular to said frame elements in rows of alternate polarity wherein spacing between said electrode rows of alternate polarity is less than or equal to a diameter of said electrodes; and a fluid swiveling means in fluid communication with said corona discharge reactor means for creating and directing a turbulent flow of said fluid through said reactor, such that when an electrical power supply is connected to said electrodes, a substantially uniformly distributed plurality of electrical microdischarges is produced, said electrical microdischarges reacting with constituents of said fluid to produce activated radicals, said fluid swiveling means providing high exposure of said fluid to said electrical microdischarges, such that contaminants contained in said fluid are attacked and decomposed by said radicals.

2. The system of claim 1 wherein a gap remains between said conducting element and said insulating jacket, said gap being filled with oil.

3. The system of claim 1 wherein said electrodes are open at one end, comprising a conducting end, and wherein said upper and lower frame elements each have a conducting and non-conducting portion, wherein a first row of said electrodes has said conducting end electrically connected to said conducting portion of a first of said upper and lower frame elements, and its insulating jacket connected to said non-conducting portion of an opposing one of said frame elements, wherein a second row of said electrodes has said conducting end electrically connected to said conducting portion of a second of said upper and lower frame elements, and its insulating jacket connected to said non-conducting portion of and opposing one of said frame elements.

4. The system of claim 1 wherein said electrodes are hollow and open-ended.

5. The system of claim 4 wherein said upper and lower frame elements are hollow each of said frame elements being provided with a plurality of holes arranged in rows for insertion and retention therein of said electrodes, wherein an electrical wire is connected between each of said electrodes and subsequent one of said electrodes of equivalent polarity.

6. The system of claim 5 wherein said hollow frame elements are filled with oil.

7. The system of claim 6 wherein said oil is passed through said hollow open-ended electrodes for cooling said electrodes.

8. The system of claim 7 wherein said passage of said oil is facilitated by a pump and heat exchange system.

9. The system of claim 1 wherein said fluid swiveling means comprises a casing having a closed rear portion, an open front portion arranged perpendicular to a direction of flow of said fluid, and a fluid outlet; and a primary swiveling means and a secondary swiveling means mounted within said casing.

10. The system of claim 9 wherein said primary swiveling means comprises a first frame mounted within said open front portion of said casing and a first series of vortex chambers arranged within said first frame, wherein each of said vortex chambers is provided with inlet channels positioned to receive incoming flow of said fluid and outlet channels arranged perpendicular to direction of said incoming fluid flow, such that said incoming fluid flow entering said vortex chambers undergoes swiveling; and wherein secondary swiveling means comprises a second frame mounted within said closed rear portion of said casing and a series of second vortex chambers arranged within said second frame.

11. The system of claim 9 wherein said primary swiveling means comprises a plurality of tubes, each of said tubes having an open end, a closed end and a series of apertures, said electrodes being interspersed between adjacent said tubes, wherein a first set of said tubes serve as primary swivelers and a second set of said tubes serve as secondary swivelers, said secondary swivelers having greater length than said primary swivelers, said open ends of said primary swivelers being aligned with said closed ends of said secondary swivelers, such that said fluid enters said open ends of said primary swivelers and exits through said apertures of said primary swiveler, passing through said interspersed electrodes, such that said fluid enters said apertures of said secondary swiveler and exits through said open end of said secondary swiveler.

12. The system of claim 1 further provided with a micron filter positioned within said inlet of said housing, in front of said primary swiveling means, for removing particles from said fluid.

13. The system of claim 1 further provided with a blower for sucking decontaminated gas out of said housing and expelling said decontaminated gas through said fluid outlet.

14. The system of claim 1 wherein said electrodes are arranged in a series of concentric rings of increasing diameter around a central region, said central region being open at one end and closed at the other end, and wherein said swiveling means is positioned within said central region.

15. The system of claim 14 wherein said swiveling means comprises a tube having an open end positioned at said open end of said central region, a closed end positioned at said closed end of said central region, and a series of apertures situated along the length of said tube, such that said fluid enters through said open end of said tube and exits via said apertures.

16. The system of claim 15 wherein the total area of the vertical cross-sections of said apertures is greater than or equal to the area of said central tube.

17. The system of claim 15 wherein the distance between said central tube and the ring of electrodes of smallest diameter is equivalent to one quarter of the diameter of said apertures.

18. The system of claim 14 wherein said swiveling means comprises a cone having a base and a flattened end, said base being positioned at said closed end of said central region and said flattened end being positioned at said open end of said central region, said cone being further provided with turbulence wings arranged in a substantially spiral pattern around the external surface of said cone, such that fluid entering said open end of said central region encounters said turbulence wings of said cone, and is directed into the form of a vortex and swiveled towards said electrode rings surrounding said central region.

19. A method for purification of contaminated fluid by use of non-thermal plasma produced by dielectric gas phase corona discharge, said method comprising:

providing a housing formed with a fluid inlet and a fluid outlet, a corona discharge reactor means arranged in said housing for passage of the contaminated fluids therethrough, said reactor means comprising upper and lower frame elements and a plurality of spaced-apart oppositely charged electrodes being supported by said frame elements, arranged as a plurality of adjoining triangular modules, each of said electrodes having a conducting element surrounded by an insulating jacket, said plurality of electrodes being arranged perpendicular to said frame elements in rows of alternate polarity wherein spacing between said electrode rows of alternate polarity is less than or equal to a diameter of said electrodes, and a fluid swiveling means in fluid communication with said corona discharge reactor for creating and directing a turbulent flow of said fluid through said reactor;

connecting an electrical power supply to said electrodes, such that a substantially uniformly distributed plurality of electrical microdischarges is produced; and introducing the fluid into said fluid inlet, such that said electrical microdischarges react with constituents of said fluid to produce activated radicals, while said fluid swiveling means provides high exposure of said fluid to said electrical microdischarges, such that contaminants contained in the fluid are attacked and decomposed by said radicals.

* * * * *